United States Patent [19]

Gilts et al.

[11] 4,293,264
[45] Oct. 6, 1981

[54] PIVOTAL SHIPPING RACK SUPPORTING APPARATUS

[75] Inventors: Richard G. Gilts, Walbridge; Earl A. Hille, Elmore; Albert W. Kleine, Jr., Sylvania; Donald E. Shamp, Millbury, all of Ohio

[73] Assignee: Libbey-Owens-Ford Company, Toledo, Ohio

[21] Appl. No.: 101,124

[22] Filed: Dec. 7, 1979

[51] Int. Cl.³ .............................................. B65G 57/28
[52] U.S. Cl. ....................................... 414/38; 414/42; 414/421; 206/448
[58] Field of Search ...................... 414/38, 42, 97, 421, 414/425, 680, 754; 206/448, 449, 454; 271/210

[56] References Cited

U.S. PATENT DOCUMENTS

| | | | |
|---|---|---|---|
| 2,106,573 | 1/1938 | Moller | 414/754 X |
| 2,168,205 | 8/1939 | Harten et al. | 414/754 X |
| 2,658,630 | 11/1953 | Melin | 414/97 X |
| 3,795,323 | 3/1974 | Ouska | 414/778 |

FOREIGN PATENT DOCUMENTS 2234936  1/1974  Fed. Rep. of Germany ........ 414/38

Primary Examiner—Robert W. Saifer
Attorney, Agent, or Firm—Collins, Oberlin & Darr

[57] ABSTRACT

An apparatus having a flat pivotal member for carrying and rotating a shipping container from its normal upright transporting attitude through an angle of less than 90° to an attitude inclined from the horizontal for packing glass sheets therein. The glass sheets are placed in the shipping container when it is in the inclined packing attitude with sheets of paper interleaved therebetween and, when packed, the container is rotated to its upright transporting attitude.

6 Claims, 7 Drawing Figures

PIVOTAL SHIPPING RACK SUPPORTING APPARATUS

BACKGROUND OF THE INVENTION

1. Field of the Invention

The present invention generally relates to the packing of shipping containers with glass sheets on edge, and more particularly to an apparatus for tilting the shipping containers to an inclined attitude for packing them with the glass sheets or similar articles.

2. Description of the Prior Art

Glass sheets are normally handled and shipped in a substantially vertical position to take advantage of their greater strength in this attitude and minimize damage to the glass. According to one method of packing glass sheets in shipping containers or racks, it is customary to manually place the glass sheets on edge in the container with sheets of paper inserted between the adjacent glass surfaces. Conventionally, this packing is performed with the container in an upright position and with an operator first picking up a sheet of glass such as, for example, an automotive side light from a conveyor or buck and placing it within the container, then placing a sheet of separating material such as paper against the exposed glass surface, after which a second glass sheet is laid against the paper and so on. It has been found that in this method of packing glass sheets in shipping containers with the containers in their normal upright position, the glass sheets tend to be not seated tightly against the preceding sheet. In other words, voids are left in the glass pack, which condition produces a loose pack and leads to scratching and/or breakage during subsequent handling and shipment, thus rendering the glass sheets unfit for use. Accordingly, it is desirable to provide a tighter packing of the glass sheets in the shipping containers.

The present invention provides a novel apparatus for tilting shipping containers or racks so that their upright rear supporting members are in an inclined attitude, thus providing for a tighter packing of the glass sheets in the containers.

SUMMARY OF THE INVENTION

Briefly, the novel tilting packing apparatus constructed in accordance with the invention generally comprises a flat container-supporting member pivotally mounted on a stationary base member together with mechanism for rotating the flat, pivotal supporting member from a loading/unloading position wherein a shipping rack is placed thereon in its substantially normal shipping attitude, to a packing position wherein the upright rear supporting members of the shipping rack are in an inclined attitude. The novel tilting apparatus further includes means for supporting a horizontally disposed platform on which sheets of paper may be stacked within convenient reach of an operator.

OBJECTS AND ADVANTAGES

An object of this invention is to provide a novel tilting apparatus for supporting a shipping rack in an inclined attitude to facilitate the stacking of glass sheets therein and the inserting of sheets of separating material by an operator between adjacent glass surfaces.

Another object of this invention is to provide a novel tilting apparatus with brackets for supporting a platform in a substantially horizontal manner upon which a stack of separating sheets may be carried within handy, convenient reach of an operator.

Other objects and advantages of the invention will become more apparent during the course of the following description, when taken in connection with the accompanying drawings.

BRIEF DESCRIPTION OF THE DRAWINGS

In the drawings, wherein like numerals are employed to designate like parts throughout the same.

DESCRIPTION OF THE PREFERRED EMBODIMENTS

Figures 1, 2:
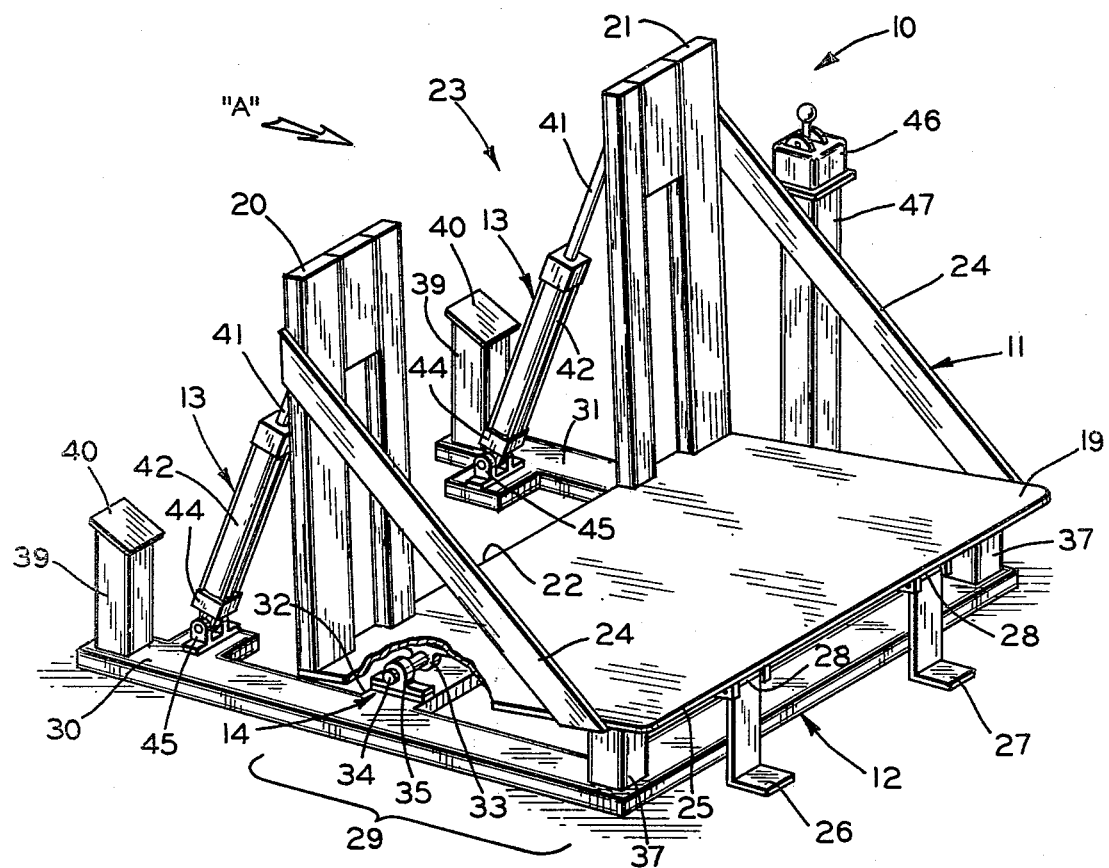
FIG. 1 is a perspective view of the tilting packing apparatus constructed in accordance with the invention and having parts thereof broken away for clarity.
FIG. 2 is an enlarged rear view, taken in the direction of arrow "A" of the apparatus illustrated in FIG. 1.
Figure 5:
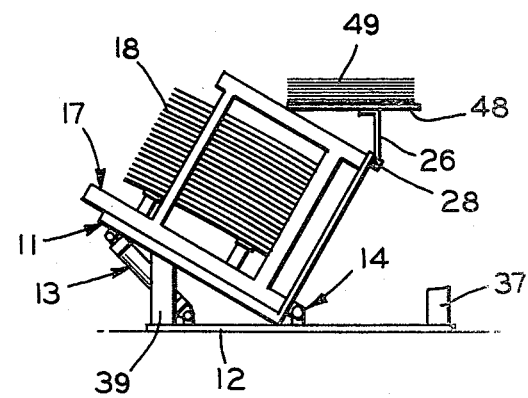
Figure 6:
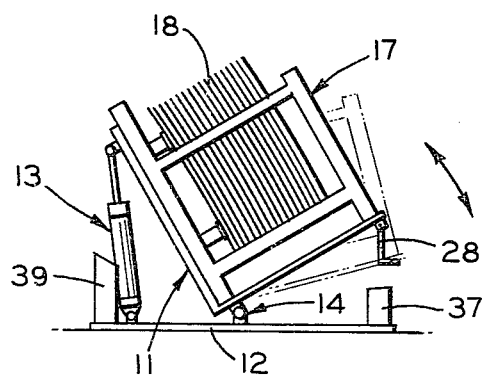
FIGS. 6 and 7 are diagrammatic views illustrating the apparatus and a packed rack in an intermediate position and in the loading and unloading position, respectively.
Figure 7:
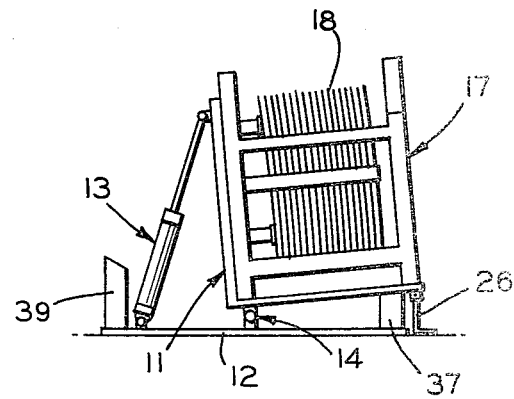

Referring now to FIG. 1, there is illustrated a novel tilting packing apparatus, designated in its entirety by the reference numeral 10, which is constructed in accordance with the invention. Briefly, the tilting packing apparatus 10 comprises a shipping container supporting member 11 rotatably mounted on a stationary base member 12 together with mechanisms 13 for rotating the rotatable supporting member 11 between a loading/unloading position and an inclined packing position. More specifically, the container supporting member 11 is capable of being rotated about a pivotal mounting 14 through a desired angle of movement; that is, through an angle of less than 90° so that upright back supports 15 and 16 of a shipping container such as a shipping rack 17 (see FIG. 5) are inclined to the horizontal whereby they support glass sheets 18, one on another during their packing in the rack 17.

As best illustrated in FIG. 1, the container-supporting member 11 may be a weldment structure and generally comprises a floor plate 19 and at least a pair of upstanding spaced-apart upright members 20 and 21 affixed normal to and along the back edge 22 of the floor plate 19. The spaced-apart upright members 20 and 21 define a central opening 23 therebetween, the purpose of which will be described hereinafter. A diagonally disposed brace 24 is affixed to and extends between the outer edge of each wall portion 20 and 21 and the adjacent side edge of the floor plate 19, thus providing a strong rigid container-supporting structure. The front edge 25 of the floor plate 19, that is, the edge opposite the edge 22, is provided with a pair of depending brackets 26 and 27 which are hingedly secured thereto as at 28 the purpose of which will be described hereinafter.

As best illustrated in FIG. 1, the stationary base 12 is conveniently constructed from a flat plate, preferably of a steel material, and has a generally rectangularly shaped portion 29 and a pair of spaced-apart arms 30 and 31 extending outwardly from the rear edge 32 of the rectangular portion 29, one adjacent each end thereof.

Figure 3:
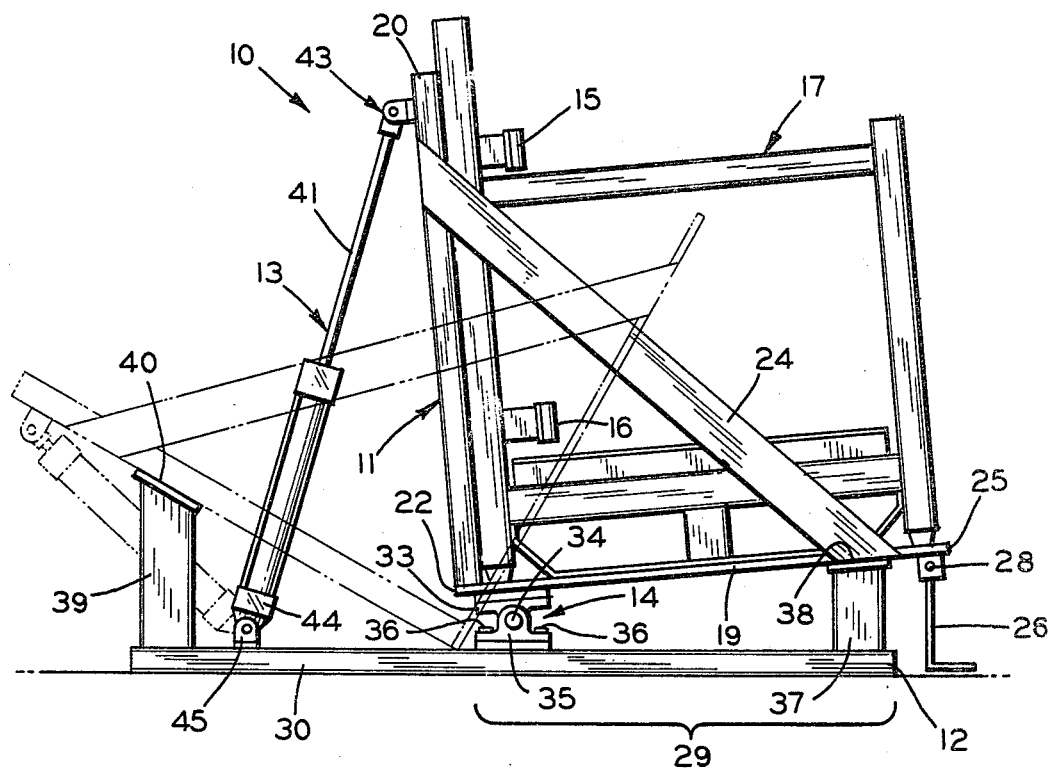
FIG. 3 is an enlarged side elevational view of the apparatus with a shipping rack thereon illustrating the apparatus in the loading/unloading position in full lines and in the inclined, rack packing position in dot-dash lines.
Figure 4:
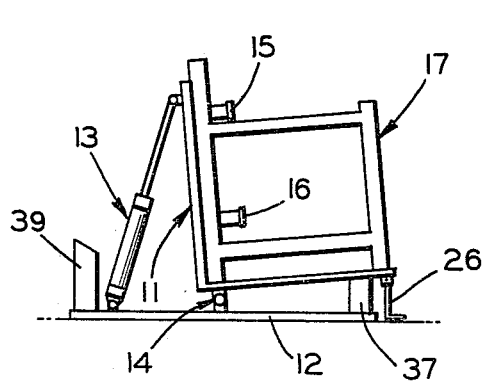
FIGS. 4 and 5 are diagrammatic views illustrating the apparatus and a shipping rack in the loading/unloading position and in the inclined packing position, respectively.

Referring now to FIGS. 1 through 3, the container supporting member 11 is pivotably mounted on the base 12 by means of brackets 33 secured to the underside of the floor plate 19 adjacent the back edge 22 thereof as by welding. The brackets 33 are pivotally mounted on a shaft 34 journalled in bearing blocks 35 affixed to the base 12 adjacent the rear side 32 of the rectangular portion 29 by means of bolts 36 (see FIG. 3).

Adjacent the front edge of the base 12 are first upstanding means for supporting the floor plate 19 of the pivotal member 11 in the container loading/unloading position. The first upstanding means comprise at least two spaced-apart upstanding pedestals 37 having an inclined supporting surface 38 and a height sufficient to support the floor plate 19 at an angle slightly downwardly inclined to the horizontal when it is in the container loading/unloading position.

Adjacent the free ends of the arms 30 and 31 are second upstanding means for supporting the upright members 20 and 21 of the pivotal member 11 in the container packing position. The second upstanding means comprise at least two spaced-apart upstanding pedestals 39 having an inclined supporting surface 40 and a heighth greater than the pedestals 37, sufficient to support the upright members 20 and 21 of the pivotal member 11 at an angle substantially inclined to the horizontal when the floor plate 19 is in the container packing position. In this position, the glass sheets 18 are stackable one on another on the back supports 15 and 16 of the shipping rack 17. Accordingly, when the pivotal support member 11 is in the container packing position, the glass sheets 18 under their own weight rest against the supports 15 and 16 resulting in tighter nesting of the glass sheets.

As best illustrated in FIGS. 2 and 3, the container supporting member 11 is rotatable through an angle of somewhat less than 90° about the axis of the shaft 34, which is located beneath the upright members 20 and 21. Referring now to FIG. 3, this structural arrangement permits the shipping rack 17 to be tilted to the packing attitude within convenient reach of the operator through the opening 23 between the upright members 20 and 21. To this end, the mechanisms 13 are connected between the uper ends of the upright members 20 and 21 and the arms 30 and 31 of the base 12. Preferably, each mechanism 13 comprises a double acting cylinder having a piston rod 41 and a power cylinder 42. The free ends of the piston rods are pivotally connected to the upper ends of the upright members 20 and 21 by a clevis connection 43, and the cylinder ends 44 are pivotally attached to a bracket 45 affixed to each arm 30 and 31. Thus, when the piston rod 41 is extended, the pivotal support member 11 is in the container loading/unloading position and rests on the inclined supporting surfaces 38 of the front pedestals 37 and when the piston rod 41 is retracted, the pivotal member 11 is rotated to the container packing position and rests on the inclined surfaces 40 of the rear pedestals 39. The hydraulic cylinders are connected to a source of hydraulic fluid (not shown) which may be controlled by a manually operated control valve 46 mounted on an upstanding pedestal 47 affixed to one side of the base 12.

In operation, a conventional shipping container of any type, such as the shipping rack 17, is deposited by a fork lift truck (not shown) upon the floor plate 19 of the pivotal suporting member 11 when it is in the loading-/unloading position. An operator then tilts the member 11, including the rack 17, rearwardly by operating the valve 46, thus retracting the piston rods 41 of the power cylinders 42. Next, the angle brackets 26 and 27 are swung up and a platform 48 (see FIG. 5) is placed on the brackets 26 and 27 and the upper side legs of the shipping rack 17. A stack of paper sheets 49 is laid on the platform within handy, convenient reach of the operator. Since the glass is loaded in a nearly horizontal position, the separating paper is much easier to insert than when the glass is loaded in a vertical position, and as previously mentioned, the glass sheets are also stacked tightly one on top of the other. When the rack 17 is fully loaded, the pivotal member 11 is returned to its loading-/unloading position by operation of the hydraulic control valve 46. As the pivotal member 11 is moved to the loading/unloading position, it may be jiggled by manipulating the valve 46 so as to insure that the lower edges of the glass sheets 18 are seated firmly upon the rack 17. After the rack is in the loading/unloading position, banding straps (not shown) are secured and tightened in the conventional manner and the rack is ready for removal by the fork lift truck.

From the foregoing, it may be seen that a novel, tiltable packing apparatus has been provided, which has not only resulted in a tighter packing of the glass sheets on a shipping rack, but has resulted in a substantial reduction of broken and scratched or damaged sheets.

It is to be understood that the form of the invention herewith shown and described is to be taken as an illustrative embodiment only of the same, and that various changes in the shape, size and arrangement of the parts may be resorted to without departing from the spirit of the invention.

We claim:
1. An apparatus for tilting a sheet-carrying shipping container from an upright transporting attitude to a container packing attitude, comprising:
  a. a flat pivotable member for carrying the shipping container and pivotable between a container loading/unloading attitude and a container packing attitude;
  b. a pair of spaced-apart upright members with their lower ends affixed to and normal to one edge of said flat pivotable member for supporting the shipping container in said container packing attitude;
  c. a base for pivotably supporting said pivotable member;
  d. means for pivotably mounting said one edge of said pivotable member to said base;
  e. first upstanding means affixed to said base for supporting said pivotable member in the container loading/unloading attitude;
  f. second upstanding means affixed to said base for supporting said pair of spaced-apart members affixed to said pivotable member in the container packing attitude;
  g. means pivotably attached between the upper ends of said spaced-apart members and said base for rotating said flat pivotable member between said container loading/unloading attitude and said container packing attitude; and
  h. a platform and means affixed to said flat pivotable member for supporting said platform when said pivotable member is in said container packing attitude.

2. An apparatus for tilting a sheet carrying shipping container, as claimed in claim 1, wherein said first upstanding means comprises a pair of spaced-apart pedestals disposed along one edge of said base for supporting said flat pivotable member in the container loading/unloading attitude which is slightly inclined to the horizontal and said second upstanding means comprises a pair of spaced-apart pedestals along the opposite edge of said base and having a height greater than said first pair of said spaced-apart pedestals for supporting said upright members affixed to said flat pivotable member at an angle substantially inclined to horizontal when said flat pivotable member is in the container packing attitude.

3. An apparatus for tilting a sheet carrying shipping container as claimed in claim 2, wherein said first pair of pedestals and said second pair of pedestals have downwardly inclined supporting surfaces converging towards each other.

4. An apparatus for tilting a sheet carrying shipping container as claimed in claim 1, wherein said rotating means comprises a pair of double acting power cylinders.

5. An apparatus for tilting a sheet carrying shipping container as claimed in claim 4, including means for selectively operating said power cylinders.

6. An apparatus for tilting a sheet carrying shipping container as claimed in claim 1, wherein said platform supporting means comprises a pair of angle brackets pivotally affixed to the edge of said flat pivotable member opposite said one edge.

* * * * *